United States Patent Office 3,737,451
Patented June 5, 1973

3,737,451
CIS-3,4 - DIARYL-CYCLOPENTYLIDENE- AND
1 - CYCLOPENTENE-1-ACETIC ACIDS AND
DERIVATIVES
Faizulla G. Kathawala, West Orange, N.J., assignor to
Sandoz-Wander, Inc., Hanover, N.J.
No Drawing. Filed Sept. 23, 1970, Ser. No. 74,887
Int. Cl. C07c 65/14, 69/76
U.S. Cl. 260—469   37 Claims

ABSTRACT OF THE DISCLOSURE

The invention discloses cis-3,4-diphenyl-cyclopentylidene-acetic acids and cis-3,4-diphenyl-1-cyclopentene-1-acetic acids, and amide derivatives thereof, such compounds having pharmacological activity and being useful, for example, as anti-inflammatory agent. The acids may be prepared by hydrolysis, e.g., saponification, of the corresponding esters and the amides may be prepared from the acids by reacting the acid with a thionylhalide and then with the appropriate amine, in a known manner. The esters may be prepared by reaction of the corresponding cis-3,4-diphenyl-cyclopentane-one with a trialkylphosphono-acetate in the presence of a strong base, e.g., sodium hydride.

---

The present invention relates to chemical compounds, and more particularly to cis-3,4-diaryl-cyclopentylidene-acetic acids and cis-3,4-diaryl-1-cyclopentene-1-acetic acids, and various amide derivatives thereof. The invention also relates to pharmaceutical compositions and methods utilizing the pharmacological properties of said compounds. The invention also relates to the corresponding esters which are useful in preparation of said compounds.

The compounds of the present invention may be represented by the structural Formulae I-A and I-B, as follows:

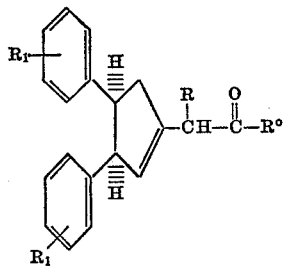

I-A and

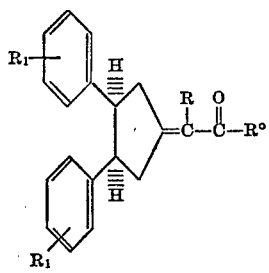

I-B wherein
R° is —OH or

R' is hydrogen, and
R" is hydrogen, lower alkyl of 1 to 5 carbon atoms, phenyl substituted by 1 or 2 members independently from the group of halo of atomic weight of from 18 to 80, lower alkyl of 1 to 3 carbon atoms, lower alkoxy of 1 to 3 carbon atoms, or di(lower of 1 to 3 carbon atoms) alkylamino(lower of 2 or 3 carbon atoms)alkyl, or R' and R" together with the nitrogen to which they are attached form di(lower of 1 to 3 carbon atoms)alkylamino, or R' and R" together with the nitrogen to which they are attached form a 5 or 6 membered saturated heterocyclic group represented by:

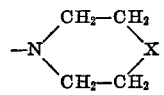

X is (a) a direct bond, (b) methylene, (c) oxygen or (d) N—$R_x$ wherein $R_x$ is hydrogen or lower alkyl of 1 to 3 carbon atoms, e.g., morpholino and 4-methyl-piperazinyl, R is hydrogen or straight chain lower alkyl of 1 to 3 carbon atoms, and both $R_1$ which are the same, are hydrogen, hydroxy, halo of atomic weight of from 18 to 80, lower alkyl of 1 to 4 carbon atoms, lower alkoxy of 1 to 4 carbon atoms or trifluoromethyl.

The compounds of the Formulae I-A and I-B in which R° is —OH are preferably prepared by a Procedure A involving subjecting a cis-3,4-diphenyl-1-cyclopentylidene-acetic acid ester the Formula II:

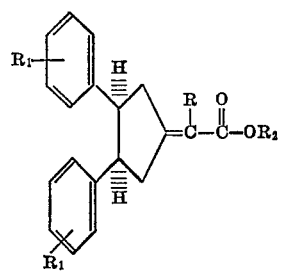

II in which R and $R_1$ are as defined and $R_2$ is lower alkyl of 1 to 4 carbon atoms, preferably ethyl, to hydrolysis followed by separation from the resulting reaction mixture of the individual compounds of the Formulae I-A and I-B.

The preparation of the reaction mixture containing the products of the Formulae I-A and I-B by Procedure A may be carried out in a conventional manner for the hydrolysis of an ester to an acid and may be effected accordingly either in the presence of a dilute aqueous acidic medium or by saponification in the presence of a dilute solution of a strong base followed by acidification in a known manner. The reaction may be suitably carried out at temperatures in the range of 5° C. to 100° C., preferably 40° C. to 80° C. The reaction is desirably effective in an inert organic solvent medium preferably provided by employing a water miscible organic solvent of known type such as a lower alkanol, e.g., methanol and ethanol. The reaction is desirably effected by saponification employing an alkali metal hydroxide such as sodium hydroxide or potassium hydroxide followed by acidification with a strong inorganic acid such as hydrochloric acid. The reaction mixture contains both the compound of Formula I-A and the compound of the Formula I-B and these products may be separated and recovered by working up of the reaction mixture by established procedures and separation of the products in a known manner, for example, by selective crystallization employing appropriate crystallization solvents, as illustrated hereinafter in Step E of Example 1.

The compounds of the Formula II are preferably prepared by reaction in a Procedure B a cis-3,4-diphenyl-cyclopentane-one of the Formula III:

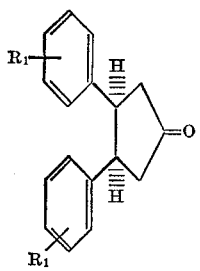

III in which $R_1$ is as defined, with a compound of the Formula IV:

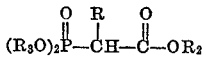

in which R and $R_2$ are as defined and $R_3$ is methyl or ethyl, preferably ethyl, in the presence of a strong base.

The preparation of the compounds II by Procedure B involves a reaction of known type suitably carried out at temperatures in the range of from 0° C. to 60° C., preferably 10° C. to 30° C. The reaction is carried out in an inert organic solvent of conventional type which is preferably an ether such as diethyl ether, tetrahydrofuran and dimethoxyethane, preferably the latter. The strong base employed in the reaction is desirably sodium hydride. The reaction of Procedure B when carried out under preferred conditions results in a reaction product containing predominantly the desired compound of the Formula II and a minor amount of the corresponding isomer, i.e., the corresponding cis-3,4-diphenyl-1-cyclopentene - 1 - acetic acid ester of the Formula II-A:

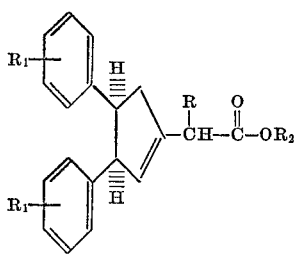

II-A in which R, $R_1$ and $R_2$ are as defined. In the usual situation the conducting of Procedure B under preferred conditions results in a mixture containing not more than about 20% of the compound of the Formula II-A based on the total amount of the compounds of the Formulae II and II-A in the mixture, more usually about 2–15% of the compound of the Formula II-A. Established separation techniques may be applied to separate the compound of the Formula II-A and the compound of the Formula II. However, the compounds of the Formula II-A are also useful as a starting material in the reaction of Procedure A to produce the compounds of the invention of the Formula I-A (in which R° is —OH). It will thus be evident that the reaction mixture produced by the reaction of Procedure B may be worked up by conventional techniques to produce a crude product mixture containing both the compounds of the Formulae II and II-A, and that such product mixture may be suitably employed without further separation as the starting material in Procedure A, as essentially illustrated hereinafter in Steps D and E of Example 1.

The compounds of the Formulae III and IV employed as starting materials in Procedure B are either known or may be prepared from known materials by the established procedures including the procedures analogous to those for preparation of the known compounds. A prepared reaction sequence for preparation of the compounds of Formula III is partially illustrated in Example 1 hereinafter, and may be outlined as follows:

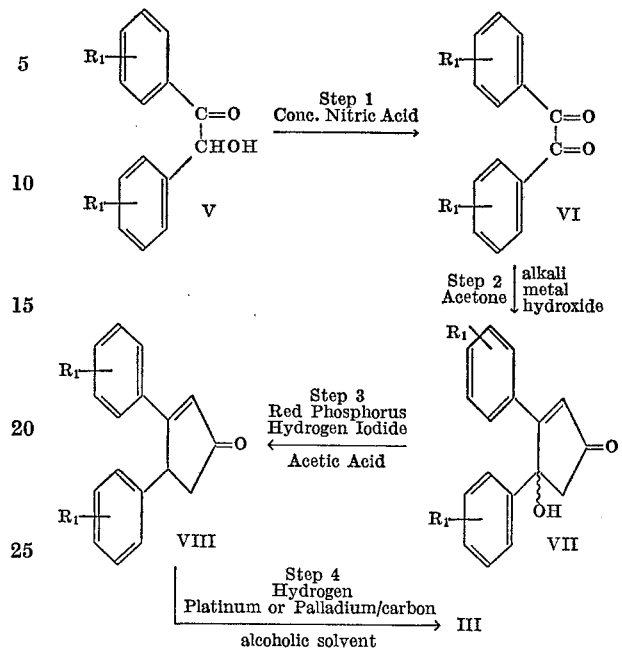

It will be evident that the above preferred reaction sequence for the preparation of Compounds III will involve certain well known considerations when employed to produce the compounds of the invention in which $R_1$ is hydroxy or alkoxy. Thus, it will be evident that the reaction of Step 1 is difficult to conduct effectively when $R_1$ is hydroxy and if it is desired to have both $R_1$ as hydroxy in the compounds of the Formulae I-A, I-B, II and II-A then the compounds of the Formula V used as starting material has both $R_1$ being alkoxy and such alkoxy groups are converted to hydroxy groups during the reaction of Step 3 to produce a compound of the Formula VIII in which both $R_1$ are hydroxy. It will thus be further evident that the preparation of the compounds of the Formulae I-A, I-B, II and II-A in which both $R_1$ are alkoxy is accomplished by introducing the alkoxy subsequent to the reaction of Step 3 by reacting a compound of the Formulae VIII, III, II, II-A, I-A or I-B in which one or both $R_1$ are hydroxy with an appropriate reagent, e.g., diazomethane in an ether solvent or an alkylhalide in the presence of an alkali metal t-butoxide, according to well known procedures. In general, it is desirable to introduce the alkoxy groups by converting the compounds of the Formulae II and II-A in which one or both $R_1$ are hydroxy, and thus just before the preparation of the compounds of the Formulae I-A and I-B from said compounds of the Formulae II and II-A.

The compounds of the Formulae I-A and I-B in which R° is —NR'R" are preferably prepared from the compounds of the Formulae I-A and I-B in which R° is —OH, respectively, by reacting in a Procedure C a compound of the Formula I-A or I-B in which R° is —OH first with thionyl chloride followed by reaction of the resulting acid chloride with a compound of the Formula IX:

NHR'R"           (XI)

in which R' and R" are as above defined.

The conversion of the Compound I-A or I-B to the acid halide in Procedure C employing thionyl chloride may be carried out at temperatures in the range of from 10° C. to 150° C., preferably 0° C. to 100° C. The conversion may be carried out employing an excess of thionyl chloride as solvent or in the presence of inert organic solvents of conventional type. The reaction of the resulting acid chloride with the compound of the Formula IX may be carried out in a conventional manner at temperature within the range of from 0° C. to 100° C. either in an inert organic solvent of conventional type and/or in a medium established by using an excess of the compound of the Formula IX if the latter is liquid under the reaction conditions. The reaction product of the Formula I–A or I–B in which R° is —NR′R″ may be recovered from the reaction mixture by working up by established procedures. The starting material employed in Procedure C may be either a compound of the Formula I–A or I–B in which R° is —OH, or a mixture of such compounds of the Formulae I–A and I–B, and product mixtures containing both the final product of the Formulae I–A and I–B in which R° is —NR′R″ may be separated into the individual final products by conventional separation procedures. When the starting material is of the Formula I–B in which R° is —OH and it is desired to produce the compound of the Formula I–B in which R° is —NR′R″, then the reaction of Procedure C involving the production of the required acid halide is desirably carried out under neutral conditions, desirably under anhydrous conditions, to avoid isomerization and thus to avoid unwanted conversion to the compound of the Formula I–A. In Procedure C, it will be evident that the thionyl chloride may be replaced by other suitable reagents yielding the acid chloride or other suitable acid halide, viz the acid bromide or iodide, for example, thionyl bromide may be used.

Certain of the compounds of the Formulae I–A and I–B in which R° is —NR′R″ have a basic nitrogen atom and will form acid addition salts as will be evident to those skilled in the art, and the non-toxic pharmaceutically acceptable acid addition salts are also to be understood to be included within the scope of the compounds of the invention. Such salts include, by way of illustration only, the hydrochloride, maleate, acetate, citrate and sulfonate. The acid addition salts may be produced as desired from the corresponding free bases by conventional procedures. Conversely, the free bases may be obtained from the acid addition salts by established procedures.

The compounds of Formulae I–A and I–B are useful because they possess pharmacological activity in animals. In particular, the Compounds I are useful an anti-inflammatory agents as indicated by a reduction in foot volume and an improvement in grip strength in the adjuvant arthritis test in rats using *Mycobacteria butyricum* in Freund's adjuvant. For such use, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. The dosage administered will, of course, vary depending upon the compound used and the mode of administration. However, in general, satisfactory results are obtained when administered at a daily dosage of from about 2 milligrams to about 200 milligrams per kilogram of body weight, preferably given in divided doses 2 to 4 times a day, or in sustained release form. For most mammals the administration of from about 120 milligrams to about 2000 milligrams of the compound per day provides satisfactory results and dosage forms suitable for internal administration comprise from about 30 milligrams to about 1000 milligrams of the compound in admixture with a solid or liquid pharmaceutical carrier or diluent.

For the above usage, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents(methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the sandpoint of preparation and ease of administration are solid compositions, particularly hard-filled capsules and tablets.

A representative formulation is a tablet prepared by conventional tabletting techniques and containing the following ingredients:

| Ingredient: | Weight (mg.) |
|---|---|
| Cis-3,4-diphenyl-α-methyl - 1 - cyclopenten-1-acetic acid | 50 |
| Tragacanth | 10 |
| Lactose | 197.5 |
| Corn starch | 25 |
| Talcum | 15 |
| Magnesium stearate | 2.5 |

The following examples show representative compounds encompassed within the scope of this invention and the manner in which such compounds are prepared. However, it is to be understood that the examples are for purposes of illustration only.

EXAMPLE 1

Cis-3,4-bis(p-chlorophenyl)-cyclopentylidene-acetic acid

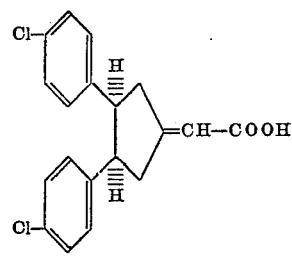

and

Cis-3,4-bis(p-chlorophenyl)-1-cyclopentene-1-acetic acid

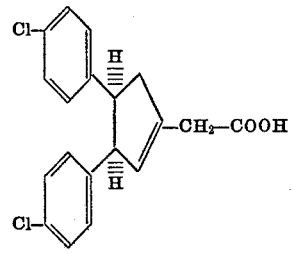

STEP A.—Preparation of 4 - hydroxy-3,4-bis(p-chlorophenyl)-2-cyclopentene-1-one: To a suspension of 10.4 g.

of 4'-4'-dichlorobenzil in 20 ml. acetone and 40 ml. of tetrahydrofuran is added 0.4 ml. of 33% aqueous potassium hydroxide and 0.1 ml. of absolute ethanol and the resulting suspension is stirred at room temperature for 3.5 hours. Thereafter is added 2.4 ml. of additional 33% potassium hydroxide solution and the resulting solution is stirred at room temperature for another two hours. The resulting solution is evaporated in vacuo, treated with water and methylene chloride, and the resulting solid filtered off, washed with water and methylene chloride and dried to obtain 4-hydroxy-3,4-bis(p-chlorophenyl)-2-cyclopentene-1-one, M.P. 234–235° C.

STEP B.—Preparation of 3,4 - bis(p - chlorophenyl) - 2 - cyclopentene - 1 - one: A suspension of 5 g. of 4 - hydroxy - 3,4 - bis(p - chlorophenyl) - 2 - cyclopentene - 1 - one and 1 g. of red phosphorous in 0.5 ml. of 55% hydrogen iodide and 20 ml. of glacial acetic acid is heated at reflux for 35 minutes. After cooling, the solution is filtered to remove phosphorous, evaporated in vacuo and the oily residue taken up in diethyl ether. The ether solution, after washing with 10% sodium bisulfite solution, several times with water and saturated sodium chloride, is dried over sodium sulfate and evaporated in vacuo to give an oil which is crystallized from diethyl ether to obtain 3,4-bis(p-chlorophenyl)-2-cyclopentene-1-one, M.P. 96–97° C.

STEP C.—Preparation of cis-3,4-bis(p-chlorophenyl)-cyclopentane-one: A solution of 1.52 g. of 3,4-bis(p-chlorophenyl)-2-cyclopentene-1-one in 50 ml. of absolute ethanol is mixed with 160 mg. of 83% platinum oxide and hydrogenated at 50 p.s.i. in a Paar apparatus. After the uptake of hydrogen, just short of theory, the catalyst is filtered off, the solution evaporated in vacuo to give an oil which is filtered over silica with benzene. The resulting solution containing the reaction product is evaporated in vacuo and the residue crystallized from ethanol to obtain cis-3,4 - bis(p-chlorophenyl)-cyclopentane-one. M.P. 94–97° C.

STEP D.—Preparation of cis - 3,4 - bis(p-chlorophenyl)-cyclopentylideneacetic acid ethyl ester: To a slurry of 2.1 g. of 57% sodium hydride in 140 ml. dimethoxyethane in an ice bath is added portionwise over 5 minutes 12.33 g. of triethylphosphono acetate. After stirring the mixture for two hours at room temperature, a solution of 13.8 g. of cis-3,4 - bis(p - chlorophenyl)-cyclopentane-one in 140 ml. of dimethoxyethane is added quickly, and the solution stirred overnight. Thereafter the mixture is poured into ice water and extracted several times with diethyl ether. The combined ether extracts after washing with water is dried and evaporated in vacuo to give a crude oil of cis-3,4-bis(p-chlorophenyl)-cyclopentylidene-acetic acid ethyl ester containing about 10% of cis-3,4-bis(p-chlorophenyl)-1-cyclopentene-1-acetic acid ethyl ester.

STEP E.—Preparation of cis-3,4-bis(p-chlorophenyl)-cyclopentylidene-acetic acid and cis-3,4-bis(p-chlorophenyl)-1-cyclopentene-1-acetic acid: A suspension of 4.0 g. of the crude cis-3,4-bis(p-chlorophenyl) - 1 - cyclopentylidene-acetic acid ethyl ester obtained in Step D, above, in a solution of 8 g. of sodium hydroxide in 72 ml. of ethanol and 8 ml. water is refluxed for 16 hours. Ethanol is then removed in vacuo, the residue dissolved in water, acidified with concentrated hydrochloric acid and extracted several times with diethyl ether. The combined ether extracts, after washing with water and saturated sodium chloride solution, is dried and evaporated in vacuo. The residue is dissolved in methylene chloride and diethyl ether added to crystallize a material which is filtered off and dried to obtain cis - 3,4 - bis(p-chlorophenyl)-cyclopentylidene-acetic acid, M.P. 230–237° C. The filtrate, i.e., mother liquid, is evaporated in vacuo and the residue dissolved in diethyl ether and petroleum ether then added to crystallize cis - 3,4 - bis(p-chlorophenyl)-1-cyclopentene-1-acetic acid, M.P. 144–146° C.

EXAMPLE 2

N-(p-chlorophenyl)-cis-3,4-diphenyl-1-cyclopentene-1-acetamide

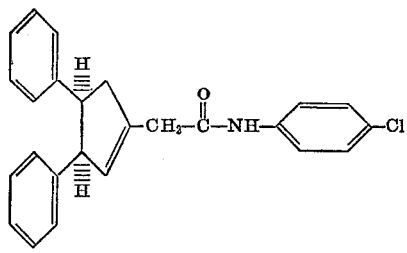

A solution of 5.0 g. of cis-3,4-diphenyl-1-cyclopentene-1-acetic acid in 50 ml. of thionylchloride is stirred at room temperature for 105 minutes. Thereafter the solution is refluxed for 15 minutes and evaporated in vacuo to dryness. The residue is dissolved two times with 2.5 ml. of absolute benzene and evaporated in vacuo. The resulting crude acid chloride is dissolved in 50 ml. of benzene, cooled in ice bath and there is then added 5.0 g. of p-chloroaniline as a solid. After half an hour the ice bath is removed and the mixture is stirred at room temperature overnight. Thereafter the mixture is evaporated in vacuo, the residue treated with 2 N sodium hydroxide solution and extracted with methylene chloride. The methylene chloride extracts are successively washed with 2 N hydrochloric acid and water and then dried and evaporated in vacuo. The residue is crystallized from ethyl acetate to obtain N-(p-chlorophenyl) - cis - 3,4 - diphenyl-1-cyclopentene-1-acetamide, M.P. 170–172° C.

EXAMPLE 3

Following the procedure of Example 1 the following compounds of the invention are obtained:

(a) cis-3,4-diphenyl-1-cyclopentene-acetic acid, M.P. 141–144° C. (crystallization from methylene chloride/diethyl ether).
(b) cis-3,4-diphenyl-α-methylcyclopentylidene-acetic acid, M.P. 205–205° C. (crystallization from diethyl ether).
(c) cis - 3,4 - diphenyl - α-methyl-1-cyclopentene-1-acetic acid, M.P. 107–111° C. (crystallization from ligroin).

EXAMPLE 4

Following the procedure of Example 2 the following compounds of the invention are obtained:

(a) N-(p-ethoxyphenyl)-cis-3,4-diphenyl-1-cyclopentene-1-acetamide, M.P. 117–120° C. (crystallization from benzene).
(b) N - (p - chlorophenyl) - cis - 3,4-diphenyl-α-methyl-1-cyclopentene-1-acetamide, M.P. 158–163° C. (crystallization from diethyl ether).

What is claimed is:
1. A compound selected from the group of : (a) a compound of the formula:

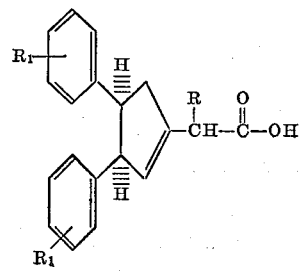

and (b) a compound of the formula:

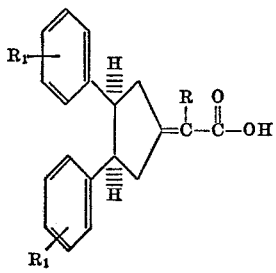

wherein
R is hydrogen or straight chain lower alkyl, and
both $R_1$ which are the same, are hydrogen, hydroxy, halo of atomic weight of from 18 to 80, lower alkyl, lower alkoxy or trifluoromethyl;
or a pharmaceutically acceptable acid addition salt thereof.

2. A compound of claim 1 having the formula:

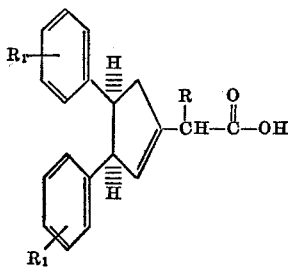

in which R and $R_1$ are as defined in claim 1.
3. A compound of claim 2 in which R is lower alkyl.
4. A compound of claim 3 in which R is methyl.
5. The compound of claim 4 in which each $R_1$ is hydrogen.
6. The compound of claim 5 in which each $R_1$ is p-chloro.
7. A compound of claim 2 in which R is hydrogen.
8. The compound of claim 7 in which each $R_1$ is hydrogen.
9. The compound of claim 7 in which each $R_1$ is p-chloro.
10. A compound of claim 1 having the formula:

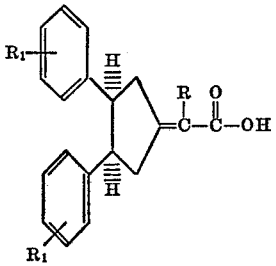

in which R and $R_1$ are as defined in claim 1.
11. A compound of claim 10 in which R is lower alkyl.
12. A compound of claim 11 in which R is methyl.
13. The compound of claim 12 in which each $R_1$ is p-chloro.
14. The compound of claim 12 in which each $R_1$ is hydrogen.
15. A compound of claim 10 in which R is hydrogen.
16. The compound of claim 15 in which each $R_1$ is hydrogen.
17. The compound of claim 15 in which each $R_1$ is p-chloro.

18. A compound of the formula:

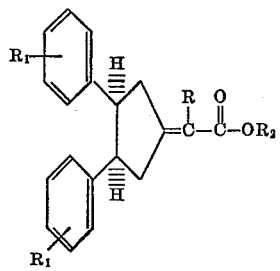

wherein $R_2$ is lower alkyl, R is hydrogen or straight chain lower alkyl, and both $R_1$, which are the same, are hydrogen, hydroxy, halo of atomic weight of from 18 to 80, lower alkyl, lower alkoxy or trifluoromethyl.
19. A compound of claim 18 in which R is lower alkyl.
20. A compound of claim 19 in which R is methyl.
21. A compound of claim 20 in which each $R_1$ is hydrogen.
22. A compound of claim 20 in which each $R_1$ is p-chloro.
23. A compound of claim 20 in which $R_2$ is ethyl.
24. A compound of claim 18 in which R is hydrogen.
25. A compound of claim 24 in which each $R_1$ is hydrogen.
26. A compound of claim 24 in which each $R_1$ is p-chloro.
27. A compound of claim 24 in which $R_2$ is ethyl.
28. A compound of the formula:

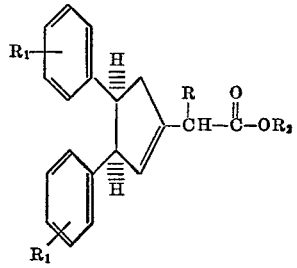

wherein $R_2$ is lower alkyl, R is hydrogen or straight chain lower alkyl, and both $R_1$, which are the same, are hydrogen, hydroxy, halo of atomic weight of from 18 to 80, lower alkyl, lower alkoxy or trifluoromethyl.
29. A compound of claim 28 in which R is lower alkyl.
30. A compound of claim 29 in which R is methyl.
31. A compound of claim 30 in which each $R_1$ is hydrogen.
32. A compound of claim 30 in which each $R_1$ is p-chloro.
33. A compound of claim 30 in which $R_2$ is ethyl.
34. A compound of claim 28 in which R is hydrogen.
35. A compound of claim 34 in which each $R_1$ is hydrogen.
36. A compound of claim 34 in which each $R_1$ is p-chloro.
37. A compound of claim 34 in which $R_2$ is ethyl.

No references cited.

JAMES A. PATTEN, Primary Examiner

U.S. Cl. X.R.

260—247.7 C, 268 PC, 293.72, 293.76, 293.83, 293.84, 326.5 E, 473 R, 473 S, 515 R, 515 A, 52 D, 558 R, 559 R, 590; 424—248, 250, 268, 274, 308, 317, 324